Patented Feb. 3, 1953

2,627,462

UNITED STATES PATENT OFFICE 2,627,462

SOYBEAN PROCESSING AND PRODUCTS

Elmer K. Pettibone, San Francisco, Calif.

No Drawing. Application November 25, 1949,
Serial No. 129,501

7 Claims. (Cl. 99—17)

(Granted under Title 35, U. S. Code (1952),
sec. 266)

The invention described herein, if patented, may be manufactured and used by or for the Government for governmental purposes without the payment to me of any royalty thereon.

This invention relates to dry flour modified by or combined with vegetable protein hydrolysates. More particularly, the invention is concerned with and illustrated by an improved processing of whole or cracked soybeans with vegetable protein hydrolysates and resulting products.

The possible use of granulated soybeans and soybean flours as a foodstuff or admixture in foodstuffs has long been recognized; however, as a practical matter, its universal adaptation and widespread acceptance to such use has not materialized. This failure is believed to be due to the inherently natural somewhat bitter flavor of the bean which has been overcome somewhat by toasting and/or mixing with a dried or liquid flavoring material, which has obvious disadvantages. In general, as in heating, the method of processing appears to provide some moderation of the soya flavor but the toasting is unsuitable as the heat destroys some nutritive value or otherwise does not penetrate the soya sufficient to obtain adequate flavor change. Further, the addition of flavoring agents, condiments and the like, known as such, has been found to be impractical as they have failed to entirely camouflage the inherent soya flavor. Also it has not been commercially feasible or practical to modify or change the soya flavor of finely granulated soybean material or soybean flours with agents in liquid form.

It is therefore an object of this invention to provide an improved process for changing, modifying or altering the natural flavor of granulated soya beans with preservation of and improvement in food nutrients.

It is another object of this invention to provide improved edible soybean flours, cereal flours and the like.

It is a further object of this invention to provide an improved method of mixing vegetable protein hydrolysates with soya beans.

Other objects, advantages, admixtures, and uses will be apparent from the following illustrations of specific examples. When a suitable type or grade of commercial vegetable protein hydrolysates is in the form of a solution, and this solution is thoroughly mixed and incorporated into soybeans by methods which obtain a thorough and uniform distribution of the hydrolysates throughout the soybeans even when the soybeans are reduced to granulation size of a flour, the result is a change in the taste characteristic to that on the order of a meaty or nutty flavor of intensity dependent on the percentage of solids of vegetable protein hydrolysates mixed with the soybeans.

The property of vegetable protein hydrolysates to have the ability to accentuate and improve the flavor of an ordinary protein, that is, a protein which has not been broken down into amino acids is well known and established, so that, for example, canned soups containing vegetable protein hydrolysates are a common article of commerce. But to obtain this flavor improvement the vegetable protein hydrolysates must be brought into contact with the ordinary protein, which is a simple matter in a liquid form such as a canned soup. To accomplish this contact by adding an aqueous solution containing vegetable protein hydrolysates to an existing and already ground soya (or other) flour is not physically or economically feasible, because of lack of thorough and uniform distribution throughout the flour and lack of penetration into the flour particles.

When, by the methods given in this application, an aqueous solution containing vegetable protein hydrolysates is thoroughly and uniformly distributed through a soya flour, or throughout particles larger than a conventional flour, the vegetable protein hydrolysates, if of suitable type, add their own flavor; accentuate and improve the flavor of the protein of the soya; mellow and improve the flavor of the starch constituent of the soya; and add significant protein value to the mixture. Maximum efficiency in adding protein value is obtained by use of hydrolysates as mentioned in this disclosure as a preferred type; that is, hydrolysates containing the full amount of glutamic acid obtained by conventional hydrolysis.

Conventional commercial solutions containing vegetable protein hydrolysates usually carry sufficient salt for preservation. This is chiefly or entirely the salt formed when the acid used in hydrolysis is neutralized with a base. The percentage of salt by weight in an ordinary solution which contains about 50% moisture would be about 16% salt which when added to a soybean material for processing, in the manner as described, may or may not be supplemented with normal salt in a conventional manner.

The preferred general process for obtaining a treated or modified soybean flour or the like is to mix with the whole soybeans, or particles thereof such as cracked soybeans or soybean grits, an aqueous solution of hydrolyzed vegetable potein in the nature of commercial preparations from wheat, corn, soybeans, or sugar beet by-products or the like; then, to obtain the mixture of soybeans and vegetable protein hydrolysates in the form of a flour, the preparation is milled or ground by conventional apparatus.

Depending on the percentage of aqueous solution of vegetable protein hydrolysates used, and the percentage of moisture in this aqueous solution of vegetable protein hydrolysates, the milling or grinding alone may produce a sufficiently dry flour to minimize or eliminate artificial drying by heat; or when a comparatively large percentage of the aqueous solution of vegetable protein hydrolysates is used, the milling or grinding will produce a flour sufficiently dry to minimize or eliminate artificial drying provided the percentage of moisture in the solution of vegetable protein hydrolysates is reduced by concentration, preferably in vacuum, prior to mixing with the soybeans or soybean particles, and prior to mixing and grinding.

The milling and grinding may be to obtain desired granulation sizes including ordinary flour, or cake flour, as desired. As the soybeans are broken down, the freshly broken surfaces are somewhat porous and there is a penetration into and either a permanent close adherence of the hydrolyzed proteins to the soybean particles or a chemical change in its flavor characteristic. The mechanical action of the milling or grinding has a tendency to obtain a thorough mixing and distribution of the hydrolyzed proteins throughout the mixture even with as fine a granulation as a flour.

The increased surface of the soybean particles resulting from milling or grinding tends toward evaporation of the moisture in the protein hydrolysates, and this, plus the heat generated by milling or grinding, reduces undesired moisture in the finished product.

After mixing and milling the prepared soybean material is in an inseparable mix which may be packaged and sold as articles of commerce.

When the percentage of water in the solution of vegetable protein hydrolysates has been properly adjusted, by concentration if necessary, prior to mixing with the soybeans, the milling or grinding produces a mix which may be as fluffy and flowing as an ordinary flour; or may be a fluffy and friable granular mixture, requiring artificial drying by heat only when a relatively high percentage of moisture has been introduced into the mixture because of use of a relatively high percentage of vegetable protein hydrolysates, or failure to adjust moisture by concentration of the solution containing vegetable protein hydrolysates prior to mixing with the soybeans.

The foregoing does not mean that concentration is carried to such lengths as to reduce the vegetable protein hydrolysates to a dry, or crystalline, or powdery form, since one of the objects of this invention is to avoid this because concentration of the vegetable protein hydrolysates to these forms might impair flavor and nutritive value. Therefore the vegetable protein hydrolysates remain in solution, although for specific purposes and products the solution may be concentrated to a relatively high percentage of solids up to the point where the solution may have to be kept warm to be sufficiently plastic for convenient and economical mixing with the soybeans.

Ordinary commercial preparations of vegetable protein hydrolysates contain varying percentages of solids. The manufacturer or processor who employs the methods shown in this disclosure determines his preference of the amount of solids of vegetable protein hydrolysates to be mixed with soybeans and then determines whether to remove any of the water from the solution containing vegetable protein hydrolysates according to simple arithmetical formulae.

Concentration of the solution containing vegetable protein hydrolysates, if preferred, is done by standard commercial methods, preferably in vacuum. During or in connection with concentration, salt may be removed consistent with reduction in moisture content, so that a balance is maintained between sufficient salt to contribute to preservation, and avoidance of excessive salty taste in finished products.

The percentages of solids of vegetable protein hydrolysates in a mixture with soybeans is determined by the type of finished product desired, as indicated by examples illustrated herein. The general object is to introduce into the mixture sufficient of the solids of the vegetable protein hydrolysates to obtain the degree of modification of natural soya flavor, and the intensity of meaty or nutty flavor desired, and to provide a mixture of soybeans and vegetable protein hydrolysates with proportion of solids of hydrolysates correct for specific uses and preferences.

The preferred form of aqueous solution of vegetable protein hydrolysates is that form which is obtained by conventional methods of acid hydrolysis, and from which none of the glutamic acid or other amino acids obtained by such conventional methods have been removed, except normal losses, in processing by conventional methods, and with retention of not less than substantially 30 per cent of glutamic acid in relation to the total protein in the hydrolysates. In some instances where the taste modification may be of lesser intensity, or where differing flavor is preferred or considered acceptable, the vegetable protein hydrolysates may have a reduced portion of glutamic acid or other amino acid.

A specific process for obtaining a treated or modified soybean flour or the like, of the character as herein described, is to vacuum concentrate an aqueous solution of hydrolyzed vegetable protein in the nature of commercial preparations, secured, for example, by the processing of wheat, corn, soybeans, and sugar beet waste, and the like, to a solids value from 80% to 96% with retention of glutamic acid in an amount corresponding to not less than 30% based on the total proteins in solution, and all the other hydrolyzed products of vegetable protein or vegetable protein mixtures. The concentrate is mixed in a warm plastic state with whole soybeans, soybean grits, or soybean particles in proportions which will provide the proportions of solids of vegetable protein hydrolysates in the finished compound desired and preferred for specific purposes and preferences and consistent with the proportions of solids of hydrolysates shown in recipes or formulae herein or in other proportions as preferred. Generally the quantity of solution is regulated to provide solids of hydrolysates which will constitute from 2% to 40% of the finished compound by weight, although a higher percentage (up to 85%) of solids of hydrolysates may be used as preferred for specific purposes and results. Thereafter the mixed preparation is milled or ground by conventional apparatus to form a light fluffy flour. The milling or grinding produces a sufficiently dry mixture that requires no artificial drying. The grinding or milling operation may be controlled to obtain granulation sizes including ordinary flour and cake flour, as desired. As the soybeans are broken down, the freshly broken surfaces are somewhat porous and there is a penetration into and either a permanent close adherence of the concentrated hydrolyzed proteins to the soybean particles or a chemical change in its flavor characteristic which causes destruction or loss of the characteristic soya flavor. In the event that milling or grinding of the mixture to flour form is not desired vacuum concentration of the vegetable protein hydrolysate, by conventional equipment, is preferable in order to conserve both flavor and nutrients. After mixing and drying or mixing and milling, the prepared soybean material is an inseparable mix which may be packaged and sold as articles of commerce. In some instances wherein the taste modification may be of lesser intensity the protein hydrolysates of vegetables may have a reduced portion of glutamic acid. Further, illustrating a soybean flour formed from a more fluid mixture a solution containing 40% hydrolyzed protein solids content with 60% moisture may be mixed with 100 parts soybeans and milled to a dry flour condition in the manner as above described.

It has been discovered that the quantity of vegetable protein hydrolysate mixed with the soybean material may be regulated to provide mixtures with varying percentages of solids, thus providing by solid content or chemical modification varying degrees of flavor. These varying degrees of flavor are found to make the various mixes suitable for varied purposes. Illustrative examples of suitable percentages of hydrolyzed vegetable protein solids to the total solids of soybean material are given as follows:

For use either alone, or mixed with cereals, fruits, or other foods, in any portion desired to form a breakfast food, to be used either in what is commonly called prepared breakfast cereal, that is, a ready to eat cereal, or in the form commonly cooked before eating: two per cent (2%) to twelve per cent (12%).

For use as a high protein food, to mix with ground or other meats for the purpose commonly called meat extender: eight per cent (8%) to thirty per cent (30%).

For use alone as a high protein food, or as a soup base or gravy base, or to mix with other foods to improve the flavor, protein, and nutritive value: five per cent (5%) to thirty per cent (30%).

For use as a baking ingredient for making breads, rolls, biscuits, cakes, cookies, doughnuts, waffles, pancakes and similar products, and to use as an ingredient in ready prepared mixes for making these products: five per cent (5%) to twenty per cent (20%).

The proportions of soybeans and of vegetable protein hydrolysates which can be used, or might be preferred, are illustrated by the more specific examples given below.

For convenience of illustration, it may be assumed, in connection with the following illustration that the aqueous solution of vegetable protein hydrolysates used is an ordinary commercial preparation, and contains 50 per cent solid hydrolysates. This solution contains all of the amino acids and solids obtained by the process of hydrolysis, no amino acids having been extracted or removed, other than normal processing losses. For convenience and brevity this solution is referred to in the examples simply as vegetable protein hydrolysates and when the word "concentrate" is used it refers to concentration of the solution containing vegetable protein hydrolysates prior to mixing with the soybeans.

The following examples will illustrate the addition of preferred proportions of solids content of vegetable protein hydrolysates in each type of granulated preparation. While commercial solutions of standard fluidity may be utilized, it is preferable to concentrate the hydrolysates solids content by reducing fluidity, in the manner as illustrated, to afford the following advantages:

a. To add vegetable protein hydrolysates which are still in solution, although of varying degrees of concentration.

b. To provide the preferred percentage of moisture for mixing, grinding, handling and storage.

c. To eliminate or minimize artificial drying by heat.

The soybeans are whole, or cracked, or as grits or other style or size of granulation as preferred. When soybean grits are used they are either of the extractor or expeller type, as desired, and may have been toasted or heat treated, if preferred.

Example 1, for soybeans treated for use as breakfast cereals, or for use with other ingredients to make a breakfast cereal:

(a) Mild type:
    98 pounds soybeans
    4 pounds vegetable protein hydrolysates Mix and grind in the manner as described. Concentration and drying are not required.

(b) Strong type:
    88 pounds soybeans
    24 pounds vegetable protein hydrolysates
    Mix and mill or grind.

Concentrate if preferred to prevent possibility of lumping.

Concentration is not necessary to insure keeping qualities under most normal conditions.

This type is too strongly flavored with solids of vegetable protein hydrolysates for use alone as a breakfast cereal, to suit the average taste. This type is good to mix with such cereals as rolled oats.

Example 2, for meat extenders:

(a) Mild type:
    90 pounds soybeans
    20 pounds vegetable protein hydrolysates.
    Concentration is not required.
    Mix and mill or grind.
    Drying after grinding is not required.

This type has more of a nutty flavor than a meaty flavor, and may not be preferred by some as a meat extender; but may be preferred as a nutlike topping for ice cream, pastries, salads, paddings, casseroles, etc.

(b) Strong type:
    80 pounds soybeans
    40 pounds vegetable protein hydrolysates.
    Mix and mill or grind.

Concentration may not be considered absolutely essential; but if not done there may be some possibility of lumping if packed in heavy bags or stored in tiers. Therefore, some degree of concentration is recommended.

Drying after grinding is not considered absolutely essential, but may be preferred according to expected storage conditions.

Concentration may be preferred to reduce salty taste, which, however, is not excessive even when concentration is not done, if care is taken in adding additional salt in making up final products.

Example 3, for a high protein soup, gravy or like base:

70 pounds soybeans
60 pounds vegetable protein hydrolysates
Mix and mill or grind.

Concentration in this case may not be essential for keeping quality, since the moisture introduced with the hydrolysates is compensated for by the salt in the hydrolysates; but concentration may be preferred to produce a dry, friable, easily handled product after grinding, with reduced likelihood of lumping if stored in bags in tiers.

Concentration also may be preferred to reduce the total salt content in the finished product.

Some degree of drying, by vacuum concentration or otherwise, after grinding may be preferred, dependent on preferred degree of concentration prior to mixing, and results desired in the finished product.

This relatively high percentage of solids of vegetable protein hydrolysates in this formula is for the purpose of giving a very meaty flavor and thus reducing the proportionate amount of the mix which appears as solids, or as a thickener, in soups.

Example 4, for a soybean flour, or a soybean coarse flour, or a fine granulated soybean meal, for use as a bread ingredient, or for use in making prepared dry mixes for waffles, pancakes, doughnuts, pastries, etc.:

92 pounds soybeans
16 pounds vegetable protein hydrolysates
Mix and mill or grind.

In this case concentration of the solution containing hydrolysates is preferably to 84% to 96% solids chiefly to prevent possibility of lumping in a finely ground flour. If the solution is concentrated, the weight of solution added is reduced to keep the proportion of solids of hydrolysates to soybeans unchanged.

Drying after grinding is not considered necessary, if adequate concentration is given prior to mixing.

Example 5, for soybeans treated to become a baking ingredient for high protein crackers and the like:

80 pounds soybeans
40 pounds vegetable protein hydrolysates

Concentration is advisable. Mix and grind. Drying after grinding may be eliminated if concentration was performed in the manner as heretofore described.

Example 6, for soybeans treated for use in making candies or confections and the like:

90 pounds soybeans
20 pounds vegetable protein hydrolysates

Concentration is not essential for keeping qualities and subsequent handling qualities, but does facilitate handling and storage.

Mix and grind. Drying, subsequent to grinding is not essential.

The size and form of the soybean particles is as preferred for varying results as to appearance and flavor in finished candies or confections and the like.

By the method of mixing hydrolyzed vegetable proteins in solution which are either concentrated or in ordinary commercial fluidity with soybean material as above described there are provided new commercial products in which the original food nutrients are retained while the mixture is being processed and which in addition, when utilized with bakery and other goods, provides a preservative effect. The soybeans have lost their undesirable flavor by some reaction or a thorough distribution of the hydrolyzed vegetable proteins thereover and to some extent therein. The prepared mixtures are in a dry state after processing which has been carried out in a manner which avoids adding the hydrolysates in dried form. Further, the mixing of fluid protein hydrolysates with soybean flour, although apparently impractical commercially, at the present time, is contemplated. Further, cereal grains as wheat, rye, barley and the like may be included with the soybeans or mixed with hydrolysates and milled to flour form in the manner as described.

The commercial solutions of vegetable protein hydrolysates, herein described, are obtained by conventional commercial processes, including acid hydrolysis, alkali hydrolysis or enzymatic hydrolysis of protein vegetables in the nature of wheat, corn, soybeans, sugar beet by-product, or any combination of these, and other like vegetable sources.

The preferred solution is one which retains substantially all of the amino acids obtained by hydrolyzing proteins of the character indicated. These amino acids may vary in number and in percentage of each dependent upon the basic raw material or materials used and the method of processing and hydrolyzing. However, as an illustrative example, a commercial solution of vegetable protein hydrolysates, used in the manner as described herein, contains most or all of the following named amino acids:

Alanine
Arginine
Aspartic acid
Cystine
Glutamic acid
Glycine
Histidine
Hydroxyproline
Isoleucine
Leucine
Lysine
Methionine
Phenylalanine
Proline
Serine
Tyrosine
Threonine
Thyroxine Some commercial solutions of vegetable protein hydrolysates may contain amino acids not specifically mentioned, as for example, in some instances the amino acid tryptophane may be added or otherwise, the solution may lack one or more of the amino acids for some specific purposes. Further, some amino acids may be present in varying quantities or percentages and one or more may be present in such small quantities as to constitute what are commonly known as trace materials. While some variations are permissible, due to the vegetable source or otherwise as heretofore indicated, it is preferred for most purposes, as herein indicated, that the glutamic acid constitute at least approximately 30 per cent by weight of the protein content of the solution.

As heretofore stated, the mixed soybean material and its hydrolyzed vegetable protein coating or impregnant prepared in the manner as indicated, with or without the salt addition, may be sold as a packaged product for use as a foodstuff or in the home preparation of foodstuffs, or utilized commercially in the preparation of foodstuffs either in whole or in part wherein flour, or flour substitute, granulated particles and the like, or similar materials have heretofore been the practice. In such replacements with the prepared soybean mixture, as herein described, preparation and processing may be accomplished as described in my copending application, Serial No. 129,503, filed November 25, 1949.

From the foregoing description of my improvements in securing a dry flour product by milling the base in conjunction with vegetable protein hydrolysates in solution or plastic state and particularly the processing of soybeans, including the products obtained thereby, it will be apparent that modifications may be made as to be within the scope of the following claims.

I claim:

1. A dry uniformly finely divided homogeneous food composition, comprising soybean flour and in intimate association therewith and inseparably adhered thereto hydrolyzed vegetable protein, said hydrolyzed vegetable protein being present in a proportion of from about 2 to about 85 parts by weight per 100 parts by weight of said food composition, said food composition being characterized by a flavor substantially devoid of palatably objectionable soya flavor.

2. A dry uniformly finely divided homogeneous food composition, comprising soybean flour and in intimate association therewith and inseparably adhered thereto hydrolyzed vegetable protein, said hydrolyzed vegetable protein being present in a proportion of from about 5 to about 30 parts by weight per 100 parts by weight of said food composition, said food composition being characterized by a flavor substantially devoid of palatably objectionable soya flavor.

3. A food composition according to claim 1, wherein at least about 30% of said hydrolyzed vegetable protein is glutamic acid.

4. A food composition according to claim 2, wherein at least about 30% of said hydrolyzed vegetable protein is glutamic acid.

5. The method of preparing a dry uniformly finely divided homogeneous food composition, comprising mixing to a uniform slurry soybean material with a solution of hydrolyzed vegetable protein, said hydrolyzed vegetable protein being present in said mixture in a proportion of from about 2 to about 85 parts by weight based on the solids content of said solution per 100 parts by weight of soybean and hydrolyzed vegetable protein solids, and conjointly grinding and drying said slurry until an intimate and inseparably adhered association of its components is obtained, which is characterized by a flavor substantially devoid of palatably objectionable soya flavor.

6. The method according to claim 5, wherein said hydrolyzed vegetable protein solution is highly concentrated.

7. The method according to claim 5, wherein said hydrolyzed vegetable protein solution contains at least about 30% glutamic acid based on the total solids weight of hydrolyzed vegetable proteins in said solution.

ELMER K. PETTIBONE.

REFERENCES CITED

The following references are of record in the file of this patent:

UNITED STATES PATENTS

| Number | Name | Date |
| --- | --- | --- |
| 1,015,891 | Ikeda | Jan. 30, 1912 |
| 1,035,591 | Ikeda | Aug. 13, 1912 |
| 1,992,462 | Barnett | Feb. 26, 1935 |
| 2,135,594 | Nohe | Nov. 8, 1938 |
| 2,379,441 | Kaehler | July 3, 1945 |
| 2,414,299 | Hall | Jan. 14, 1947 |

OTHER REFERENCES

Salomon, Food Manufacture, March 1943, pages 91–92.

Science News Letter, July 15, 1950, pages 42–43.

Food Manufacture, September 1950, pages 378–379.